United States Patent

Paul

(10) Patent No.: US 9,726,077 B2
(45) Date of Patent: Aug. 8, 2017

(54) CONNECTING ROD AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 235 days.

(21) Appl. No.: 14/613,631

(22) Filed: Feb. 4, 2015

(65) Prior Publication Data

US 2015/0233288 A1    Aug. 20, 2015

(30) Foreign Application Priority Data

Feb. 17, 2014    (DE) .......................... 10 2014 101 929

(51) Int. Cl.
| | | |
|---|---|---|
| *F16C 7/00* | (2006.01) | |
| *F01P 1/04* | (2006.01) | |
| *F02B 75/04* | (2006.01) | |
| *F02D 15/02* | (2006.01) | |

(52) U.S. Cl.
CPC ............ *F02B 75/045* (2013.01); *F02D 15/02* (2013.01)

(58) Field of Classification Search
CPC .. F02B 75/044; F02B 75/045; F04B 39/0292; F16C 7/06; F02D 15/02
USPC .......... 123/41.35, 48 R, 48 A, 48 AA, 48 B, 123/48 C, 48 D, 78 AA, 78 E, 196 R, 123/197.4, 197.3
See application file for complete search history.

(56) References Cited

U.S. PATENT DOCUMENTS

| | | | | |
|---|---|---|---|---|
| 1,959,279 | A | * | 5/1934 | Stearns .................. F16C 7/023 184/6.5 |
| 2,232,170 | A | * | 2/1941 | Eynon ...................... F16C 9/04 123/196 R |

(Continued)

FOREIGN PATENT DOCUMENTS

| | | |
|---|---|---|
| DE | 38 18 357 | 3/1989 |
| DE | 101 08 461 | 8/2001 |

(Continued)

OTHER PUBLICATIONS

German Search Report of Mar. 3, 2014.

*Primary Examiner* — Marguerite McMahon
*Assistant Examiner* — Tea Holbrook
(74) *Attorney, Agent, or Firm* — Gerald E. Hespos; Michael J. Porco; Matthew T. Hespos

(57) ABSTRACT

A connecting rod (10) has a pin bearing eye for attaching the connecting rod (10) to a crankshaft, a connecting rod bearing eye (12) for attaching the connecting rod (10) to a piston of a cylinder, and an eccentric adjusting device (13) for adjusting an effective connecting rod length. The eccentric adjusting device (13) has eccentric rods (15, 16) that act on an eccentric lever (14) of the eccentric adjusting device (13). The eccentric adjusting device (13) also has an eccentric (36) with a bore for receiving a gudgeon pin (37). Lubricating oil bores (38, 39, 40, 41) in the connecting rod bearing eye (12) and in the eccentric (36) enable a lubricating oil film to be built up between the connecting rod bearing eye (12) and the eccentric (36) and also between the eccentric (36) and the gudgeon pin (37).

7 Claims, 2 Drawing Sheets

(56) References Cited

U.S. PATENT DOCUMENTS

| | | | | |
|---|---|---|---|---|
| 2,362,158 | A * | 11/1944 | Ricardo | F01M 1/06 123/41.38 |
| 2,741,519 | A * | 4/1956 | Meurer | F01M 1/06 123/263 |
| 3,056,638 | A * | 10/1962 | Hovde | F16J 1/14 123/193.6 |
| 4,142,484 | A * | 3/1979 | Buhl | F01M 1/06 123/193.6 |
| 4,398,507 | A * | 8/1983 | Belsanti | F01P 3/06 123/41.38 |
| 4,830,517 | A | 5/1989 | Naruoka et al. | |
| 5,039,285 | A * | 8/1991 | Lindstrom | F01M 1/08 184/6.8 |
| 5,845,611 | A * | 12/1998 | Schmidt | F02F 3/22 123/41.35 |
| 6,250,275 | B1 * | 6/2001 | Bock | F01M 1/08 123/196 R |
| 6,907,848 | B2 * | 6/2005 | Beardmore | F01M 1/06 123/41.35 |
| 2003/0075125 | A1 * | 4/2003 | Kreuter | F02B 75/048 123/78 BA |
| 2009/0107464 | A1 * | 4/2009 | Berger | F02B 75/045 123/48 B |
| 2009/0107465 | A1 * | 4/2009 | Berger | F02B 75/045 123/48 B |
| 2009/0107466 | A1 * | 4/2009 | Berger | F02B 75/045 123/48 B |
| 2009/0107467 | A1 * | 4/2009 | Berger | F02D 15/04 123/48 B |

FOREIGN PATENT DOCUMENTS

| | | | |
|---|---|---|---|
| DE | 102005055199 A1 * | 5/2007 | F02B 75/045 |
| DE | 10 2010 016 037 | 9/2011 | |
| EP | 0 297 904 | 1/1989 | |
| JP | S5893906 A | 6/1983 | |
| JP | 2011196549 A | 10/2011 | |
| WO | 2007/043093 | 4/2007 | |
| WO | 2010/108582 | 9/2010 | |
| WO | 2013/050098 | 4/2013 | |

* cited by examiner

CONNECTING ROD AND INTERNAL COMBUSTION ENGINE

CROSS REFERENCE TO RELATED APPLICATION

This application claims priority under 35 USC 119 to German Patent Appl. No. 10 2014 101 929.6 filed on Feb. 17, 2014, the entire disclosure of which is incorporated herein by reference.

BACKGROUND

1. Field of the Invention

The invention relates to a connecting rod for an internal combustion engine, and to an internal combustion engine.

2. Description of the Related Art

DE 10 2010 016 037 A1 and FIG. 1 herein show a connecting rod of an internal combustion engine with an adjustable compression ratio. With reference to FIG. 1, the connecting rod 10 has a pin bearing eye 11 and a connecting rod bearing eye 12. The pin bearing eye 11 functions to attach the connecting rod 10 to a crankshaft (not shown in FIG. 1) and the connecting rod bearing eye 12 functions to attach the connecting rod 10 to a cylinder piston (not shown in FIG. 1) of the internal combustion engine. The connecting rod 10 has an eccentric adjusting device 13 that has an eccentric (not shown in FIG. 1), an eccentric lever 14 and eccentric rods 15, 16. The eccentric lever 14 has a bore arranged eccentrically with respect to a center point 17 of the connecting rod bearing eye 12 with a center point 18. The bore in the eccentric lever 14 receives the eccentric and a bore in the eccentric receives a gudgeon pin. The eccentric adjusting device 13 is used to adjust an effective connecting rod length $l_{eff}$; the connecting rod length can be understood to mean the spacing of the center point 18 of the bore in the eccentric lever 14 from a center point 19 of the pin bearing eye 11. The eccentric rods 15, 16 can be displaced to rotate the eccentric body 14 and therefore to change the effective connecting rod length $l_{eff}$. Each eccentric rod 15, 16 has a piston 20, 21 that is guided displaceably in a hydraulic chamber 22, 23. A hydraulic pressure prevails in the hydraulic chambers 22, 23 and acts on the pistons 20, 21 that are assigned to the eccentric rods 15, 16. Displacement of the eccentric rods 15, 16 is possible or impossible depending on the oil quantity in the hydraulic chambers.

The adjustment of the eccentric adjusting device 13 is initiated by the action of inertia and load forces of the internal combustion engine that act on the eccentric adjusting device 13 during a work stroke of the internal combustion engine. The directions of action of the forces that act on the eccentric adjusting device 13 change constantly during a work stroke. The adjusting movement is assisted by the pistons 20, 21 that are loaded with hydraulic oil and act on the eccentric rods 15, 16. The pistons 20, 21 prevent a return of the eccentric adjusting device 13 due to varying directions of the forces that act on the eccentric adjusting device 13. The eccentric rods 15, 16 that interact with the pistons 20, 21 are attached to the eccentric body 14 on both sides. The pistons 20, 21 are guided in hydraulic chambers 22 and 23 that can be loaded with hydraulic oil from the pin bearing eye 11 via hydraulic oil lines 24 and 25. Non-return valves 26 and 27 prevent a return flow of the hydraulic oil from the hydraulic chambers 23 and 24 back into the hydraulic lines 24 and 25. A switchover valve 29 is accommodated in a bore 28 of the connecting rod 10. The switching position of the switchover valve 29 determines which of the hydraulic chambers 22 and 23 is filled with hydraulic oil and which of the hydraulic chambers 22 and 23 is emptied and determines the adjusting direction or rotational direction of the eccentric adjusting device 13. Fluid lines 30 and 31 connect the hydraulic chambers 22 and 23 to the bore 28 that accommodates the switchover valve 29. FIG. 1 diagrammatically shows an actuating means 32, a spring device 33 and a control piston 34 of the switchover valve 29, all of which function as described in DE 10 2010 016 037 A1.

As described above, the hydraulic oil that acts on the pistons 20, 21 is fed from the pin bearing eye 11 via hydraulic lines 24 and 25 to the hydraulic chambers 22, 23. The connecting rod 10 acting by way of the pin bearing eye 11 on the crankshaft (not shown in FIG. 1) so that a connecting rod bearing shell 35 is arranged between a crankshaft bearing journal of the crankshaft and the pin bearing eye.

DE 101 08 461 B4 discloses a crankshaft bearing for an internal combustion engine with an adjustable compression ratio. The crankshaft is mounted in eccentric rings in the crankshaft bearing. The outer circumferential face of the eccentric ring has a circumferential oil distribution groove. Oil can pass in the direction of the oil distribution groove via an oil inflow channel in the engine housing.

It is an object of the invention to provide a novel internal combustion engine and a novel connecting rod.

SUMMARY OF THE INVENTION

Lubricating oil bores are made in the connecting rod bearing eye and in the eccentric, and a lubricating oil film can be built up between the connecting rod bearing eye and the eccentric and between the eccentric and the gudgeon pin via the lubricating oil bores. Thus advantageous lubrication of the contact points between the connecting rod and the eccentric and between the eccentric and the gudgeon pin is achieved.

At least two lubricating oil bores are made in the connecting rod bearing eye and at least two lubricating oil bores are made in the eccentric. The lubricating oil bores permit satisfactory lubrication of the contact points in the end positions of the eccentric adjusting device and during the adjustment of said eccentric adjusting device.

The lubricating oil bores may be made in the connecting rod bearing eye and in the eccentric so that, in a first end position of the eccentric, a first lubricating oil bore of the eccentric is aligned with a first lubricating oil bore of the connecting rod bearing eye so that a lubricating oil film can be built up between the eccentric and the gudgeon pin in the first end position via the lubricating oil bores. However, in a second end position of the eccentric, a second lubricating oil bore of the eccentric is aligned with a second lubricating oil bore of the connecting rod bearing eye so that a lubricating oil film can be built up between the eccentric and the gudgeon pin in the second end position via the lubricating oil bores. The second lubricating oil bore of the eccentric preferably is not aligned with the second lubricating oil bore of the connecting rod bearing eye in the first end position of the eccentric. Thus, a lubricating oil film can be built up between the connecting rod bearing eye and the eccentric in the first end position via the second lubricating oil bore of the connecting rod bearing eye. However, in the second end position of the eccentric, the first lubricating oil bore of the eccentric is not aligned with the first lubricating oil bore of the connecting rod bearing eye. Thus, a lubricating oil film can be built up between the connecting rod bearing eye and the eccentric in the second end position via the first lubricating oil bore of the connecting rod bearing eye. The lubricating oil bores permit satisfactory lubrication of the contact points in the end positions of the eccentric adjusting device and during the adjustment of said eccentric adjusting device.

Without being restricted hereto, exemplary embodiments of the invention will be explained in greater detail using the drawings.

DETAILED DESCRIPTION

Figure 1:
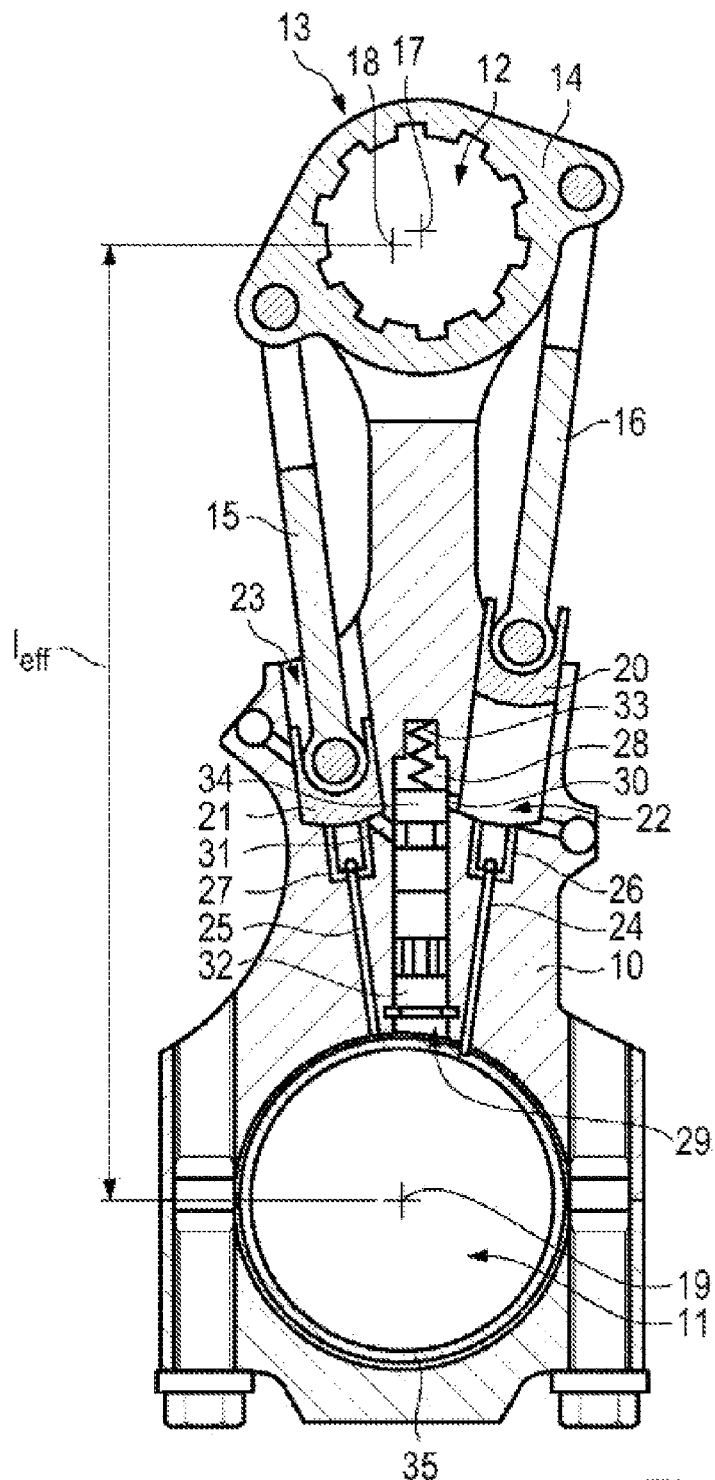
FIG. 1 shows a prior art connecting rod of an internal combustion engine with an adjustable compression ratio.

An internal combustion engine with an adjustable compression ratio has at least one cylinder, and preferably plural cylinders. Each cylinder has a piston that is coupled via a connecting rod 10 to a crankshaft of the internal combustion engine. Each connecting rod 10 has a connecting rod bearing eye 12 at one end and a pin bearing eye 11 at an opposite end. The respective connecting rod 10 acts by way of its pin bearing eye 11 on a crankshaft bearing journal of the crankshaft so that a connecting rod bearing shell is positioned between the crankshaft bearing journal and the pin bearing eye. A lubricating oil film can be built up between the connecting rod bearing shell and the crankshaft bearing journal.

An internal combustion engine with an adjustable compression ratio has an eccentric adjusting device 13 in the region of each connecting rod 10 for adjusting the effective connecting rod length of the respective connecting rod 10.

The eccentric adjusting device 13 has an eccentric 36, an eccentric lever 14 and eccentric rods 15, 16 that can be displaced to set the compression ratio depending on a hydraulic pressure prevailing in hydraulic chambers that interact with the eccentric rods. The hydraulic chambers that interact with the eccentric rods 15, 16 can be supplied with hydraulic oil starting from the pin bearing eye 11 of the respective connecting rod. The adjustment of the eccentric adjusting device is initiated by inertia and load forces of the internal combustion engine.

The eccentric lever 14 has a bore for receiving the eccentric 36, and the eccentric 36 has a bore that accommodates a gudgeon pin 37. Lubricating oil bores 38, 39 are made in the connecting rod bearing eye 12 and lubricating oil bores 40, 41 are made in the eccentric 36 and cooperate to build up a lubricating oil film between the connecting rod bearing eye 12 and the eccentric 36 and also between the eccentric 36 and the gudgeon pin 37.

The lubricating oil bores 38, 39, 40, 41 permit satisfactory lubrication of the contact points between the connecting rod bearing eye 12 and the eccentric 36 and between the eccentric 36 and the gudgeon pin 37 in the end positions of the eccentric adjusting device 13 and during the adjustment of the eccentric adjusting device 13.

Figure 2:
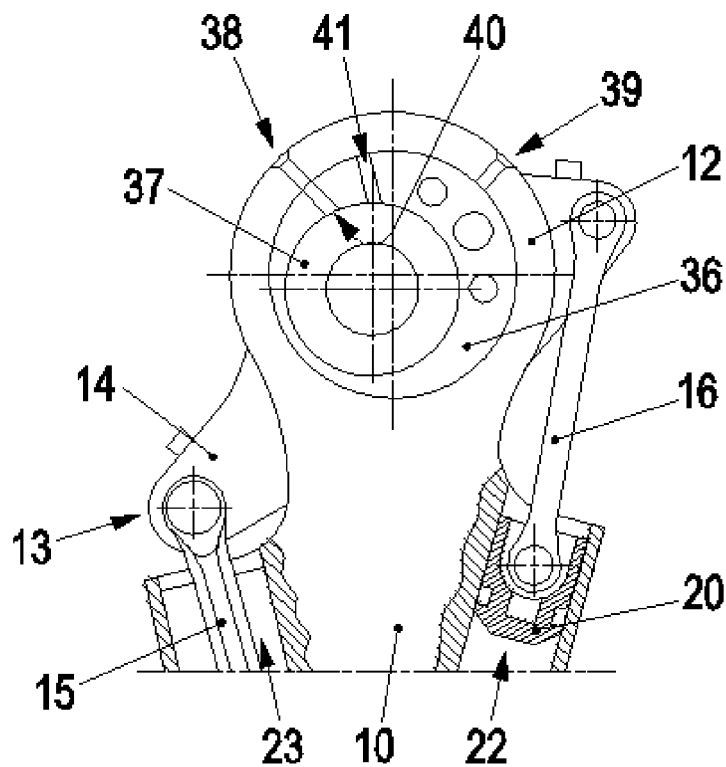
FIG. 2 shows a detail of a connecting rod according to the invention with an adjustable compression ratio in a first state.
Figure 3:
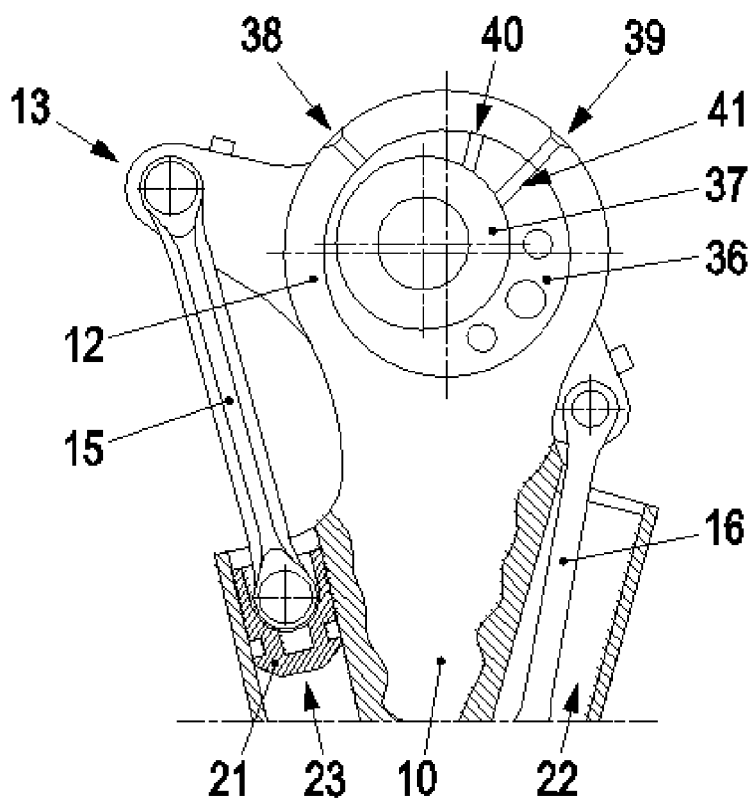
FIG. 3 shows the detail from FIG. 2 in a second state.

The exemplary embodiment of FIGS. 2 and 3 has two lubricating oil bores 38, 39 in the connecting rod bearing eye 12 and two lubricating oil bores 40, 41 in the eccentric 36.

The lubricating oil bores 38, 39, 40, 41 are made in the connecting rod bearing eye 12 and in the eccentric 36 so that, in a first end position of the eccentric 36 or the eccentric adjusting device 13, a first lubricating oil bore 40 of the eccentric 36 aligns with a first lubricating oil bore 38 of the connecting rod bearing eye 12. Thus, a lubricating oil film can be built up between the eccentric 36 and the gudgeon pin 37 in the first end position (see FIG. 2) via said lubricating oil bores 40, 38.

Furthermore, the lubricating oil bores 38, 39, 40, 41 are made in the connecting rod bearing eye 12 and in the eccentric 36 so that, in a second end position of the eccentric 36 or the eccentric adjusting device 13, a second lubricating oil bore 41 of the eccentric 36 aligns with a second lubricating oil bore 39 of the connecting rod bearing eye 12 (see FIG. 3). Thus, a lubricating oil film can be built up between the eccentric 36 and the gudgeon pin 37 in the second end position via the lubricating oil bores 41, 39.

In the first end position of the eccentric 36 or the eccentric adjusting device 13 (see FIG. 2), the second lubricating oil bore 41 of the eccentric 36 is not aligned with the second lubricating oil bore 39 of the connecting rod bearing eye 12. As a result, a lubricating oil film can be built up between the connecting rod bearing eye 12 and the eccentric 36 in the first end position via the second lubricating oil bore 39 of the connecting rod bearing eye 12. In the second end position of the eccentric 36 or the eccentric adjusting device 13 (see FIG. 3), the first lubricating oil bore 40 of the eccentric 36 is not aligned with the first lubricating oil bore 38 of the connecting rod bearing eye 12. As a result, a lubricating oil film can be built up between the connecting rod bearing eye 12 and the eccentric 36 in the second end position via the first lubricating oil bore 38 of the connecting rod bearing eye 12.

The lubricating oil bores 38, 39, 40, 41 permit particularly advantageous lubrication of the contact points between the connecting rod bearing eye 12 and the eccentric 36 and between the eccentric 36 and the gudgeon pin 37 in the end positions of the eccentric adjusting device 13 and during the adjustment of the eccentric adjusting device 13.

The lubricating oil bores 38, 39 in the connecting rod bearing eye 12 extend in the radial direction of the connecting rod bearing eye 12 and the lubricating oil bores 40, 41 in the eccentric 36 extend in the radial direction of the eccentric 36. The first lubricating oil bore 40 of the eccentric 36 and the first lubricating oil bore 38 of the connecting rod bearing eye 12 preferably have identical diameters. The second lubricating oil bore 41 of the eccentric 36 and the second lubricating oil bore 39 of the connecting rod bearing eye 12 also preferably have identical diameters.

It is also possible, however, that the first lubricating oil bore 38 of the connecting rod bearing eye 12 to have a greater diameter than the first lubricating oil bore 40 of the eccentric 36. Similarly, the second lubricating oil bore 39 of the connecting rod bearing eye 12 can have a greater diameter than the second lubricating oil bore 41 of the eccentric 36.

What is claimed is:

1. A connecting rod comprising a pin bearing eye for attaching the connecting rod to a crankshaft, a connecting rod bearing eye for attaching the connecting rod to a piston of a cylinder, and an eccentric adjusting device for adjusting an effective connecting rod length, the eccentric adjusting device having eccentric rods that act on an eccentric lever of the eccentric adjusting device, and an eccentric with a bore for receiving a gudgeon pin, first and second lubricating oil bores being in the connecting rod bearing eye and first and second lubricating oil bores being in the eccentric, wherein:

in a first end position of the eccentric, the first lubricating oil bore of the eccentric aligns with the first lubricating oil bore of the connecting rod bearing eye while the second lubricating oil bore of the eccentric does not align with the second lubricating oil bore of the connecting rod bearing eye so that a lubricating oil film can be built up between the connecting rod bearing eye and the eccentric and between the eccentric and the gudgeon pin only via the first lubricating oil bores; and in a second end position of the eccentric, the second lubricating oil bore of the eccentric aligns with the second lubricating oil bore of the connecting rod bearing eye while the first lubricating oil bore of the eccentric does not align with the first lubricating oil bore of the connecting rod bearing eye so that a lubricating oil film can be built up between the connecting rod bearing eye and the eccentric and between the eccentric and the gudgeon pin only via the second lubricating oil bores.

2. The connecting rod of claim 1, wherein the lubricating oil bores in the connecting rod bearing eye extend in the radial direction of the connecting rod bearing eye and the lubricating oil bores in the eccentric extend in the radial direction of the eccentric.

3. The connecting rod of claim 1, wherein the first lubricating oil bore of the eccentric and the first lubricating oil bore of the connecting rod bearing eye have identical diameters.

4. The connecting rod of claim 1, wherein the first lubricating oil bore of the connecting rod bearing eye has a greater diameter than the first lubricating oil bore of the eccentric.

5. The connecting rod of claim 1, wherein the second lubricating oil bore of the eccentric and the second lubricating oil bore of the connecting rod bearing eye have identical diameters.

6. The connecting rod of claim 1, wherein the second lubricating oil bore of the connecting rod bearing eye has a greater diameter than the second lubricating oil bore of the eccentric.

7. An internal combustion engine that has an adjustable compression ratio, the internal combustion engine having at least one cylinder and a crankshaft on which at least one connecting rod acts, the connecting rod having a pin bearing eye for attaching the connecting rod to the crankshaft, a connecting rod bearing eye for attaching the connecting rod to a piston of a cylinder, and an eccentric adjusting device for adjusting an effective connecting rod length, the eccentric adjusting device having an eccentric that interacts with an eccentric lever and eccentric rods that act on the eccentric lever and are loaded by a hydraulic pressure that prevails in hydraulic chambers that interact with the eccentric rods, the connecting rod being configured as claimed in claim 1.

* * * * *